(12) United States Patent
Park et al.

(10) Patent No.: US 9,306,646 B2
(45) Date of Patent: Apr. 5, 2016

(54) METHOD AND APPARATUS FOR RECEIVING DOWNLINK RADIO SIGNAL

(71) Applicant: LG ELECTRONICS INC., Seoul (KR)

(72) Inventors: Hanjun Park, Anyang-si (KR); Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/758,767

(22) PCT Filed: Dec. 30, 2013

(86) PCT No.: PCT/KR2013/012377
§ 371 (c)(1),
(2) Date: Jun. 30, 2015

(87) PCT Pub. No.: WO2014/107012
PCT Pub. Date: Jul. 10, 2014

(65) Prior Publication Data
US 2015/0341091 A1 Nov. 26, 2015

Related U.S. Application Data

(60) Provisional application No. 61/748,433, filed on Jan. 2, 2013.

(51) Int. Cl.
*H04L 1/02* (2006.01)
*H04B 7/04* (2006.01)
(Continued)

(52) U.S. Cl.
CPC ............ *H04B 7/0456* (2013.01); *H04B 7/0617* (2013.01); *H04B 7/0639* (2013.01); *H04B 7/086* (2013.01)

(58) Field of Classification Search
CPC .. H04B 7/0626; H04B 7/0632; H04B 7/0495; H04L 5/0053; H04W 84/08; H04W 28/04

USPC ................. 375/267, 260, 299, 346, 347, 349; 370/328, 432; 455/562.1, 509
See application file for complete search history.

(56) References Cited

U.S. PATENT DOCUMENTS

| | | | | |
|---|---|---|---|---|
| 2011/0223922 | A1* | 9/2011 | Kiiski | H04B 7/0495 455/446 |
| 2015/0341092 | A1* | 11/2015 | Park | H04B 7/0469 370/329 |
| 2015/0341099 | A1* | 11/2015 | Kang | H04B 7/0617 375/267 |

FOREIGN PATENT DOCUMENTS

WO 2012/112281 8/2012

OTHER PUBLICATIONS

Alcatel-Lucent Shanghai Bell, et al., "Considerations on CSI feedback enhancements for high-priority antenna configurations," 3GPP TSG-RAN WG1 #66, R1-112420, Aug. 2011, 7 pages.

(Continued)

*Primary Examiner* — Khai Tran
(74) *Attorney, Agent, or Firm* — Lee, Hong, Degerman, Kang & Waimey

(57) ABSTRACT

A method of a receiving a downlink signal from a base station including a two-dimensional (2D) antenna array composed of a plurality of antenna elements in a wireless communication system is disclosed. The method includes receiving a reference signal allocated to at least one column-direction antenna array of the 2D antenna array, receiving information about a semi-static beam candidate set composed of at least one semi-static beam applicable to the at least one column-direction antenna array, and measuring an average channel state for semi-static beamforming using the received reference signal and the information about the semi-static candidate set. The 2D antenna array is virtualized to one-dimensional (1D) antenna array supporting dynamic beamforming by applying at least one semi-static beam in the semi-static beam candidate set to the column-direction antenna array.

11 Claims, 11 Drawing Sheets

(51) Int. Cl.
*H04B 7/06* (2006.01)
*H04B 7/08* (2006.01)

(56) References Cited

OTHER PUBLICATIONS

Samsung, "Prioritization of CSI feedback enhancement scenarios for DL-MIMO," 3GPP TSG RAN WG1 Meeting #66, R1-112515, Aug. 2011, 3 pages.

Motorola Mobility, "Views on Real-life DL-MIMO Deployment Issues and Prioritization," 3GPP TSG RAN1 #66, R1-112443, Aug. 2011, 3 pages.

NTT DOCOMO, "Scenarios and potential CSI feedback enhancements for DL MIMO in Rel-11," 3GPP TSG RAN WG1 Meeting #66, R1-112433, Aug. 2011, 5 pages.

PCT International Application No. PCT/KR2013/012377, Written Opinion of the International Searching Authority dated Mar. 25, 2014, 11 pages.

* cited by examiner (a)

(b)

(a)

(b)

METHOD AND APPARATUS FOR RECEIVING DOWNLINK RADIO SIGNAL

CROSS-REFERENCE TO RELATED APPLICATIONS

This application is the National Stage filing under 35 U.S.C. 371 of International Application No. PCT/KR2013/012377, filed on Dec. 30, 2013, which claims the benefit of U.S. Provisional Application No. 61/748,433, filed on Jan. 2, 2013, the contents of which are all hereby incorporated by reference herein in their entirety.

TECHNICAL FIELD

The present invention relates to a wireless communication system, and more particularly, to a method and apparatus for receiving a downlink signal based on 3D beamforming.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method of efficiently receiving a radio signal.

The technical problems solved by the present invention are not limited to the above technical problems and other technical problems which are not described herein will become apparent to those skilled in the art from the following description.

Technical Solution

The object of the present invention can be achieved by providing a method of a receiving a downlink signal from a base station including a two-dimensional (2D) antenna array consists of a plurality of antenna elements in a wireless communication system including receiving a reference signal allocated to at least one column-direction antenna array of the 2D antenna array; receiving information about a semi-static beam candidate set consists of at least one semi-static beam applicable to the at least one column-direction antenna array; and measuring an average channel state for semi-static beamforming using the received reference signal and the information about the semi-static candidate set, wherein the 2D antenna array is virtualized to a one-dimensional (1D) antenna array supporting dynamic beamforming by applying at least one semi-static beam of the semi-static beam candidate set to the column-direction antenna array.

Preferably, the measuring the channel state may include determining a semi-static beam for enabling the reference signal to be received with maximum received power, from among the semi-static beam candidate set.

Preferably, the method may further include transmitting information about the determined semi-static beam to the base station.

Preferably, the information about the determined semi-static beam may include a size of each element of a vector corresponding to the determined semi-static beam and/or a relative phase difference between elements.

Preferably, each semi-static beam of the semi-static beam candidate set may correspond to one of vertical sectors served by the base station.

Preferably, the method may further include receiving information indicating that the reference signal is for semi-static beamforming.

Preferably, the semi-static beam may be associated with reference signal resources for dynamic beamforming.

Preferably, the method may further include, if the semi-static beam is changed, receiving information indicating the change.

Preferably, the method may further include receiving a predetermined reference signal allocated to the at least one column-direction antenna array, to which a fixed semi-static beam is applied, until reconfiguration is completed using the changed semi-static beam.

Preferably, the method may further include receiving power information for transmitting the downlink signal to be used until reconfiguration is completed using the changed semi-static beam.

In another aspect of the present invention, provided herein is a user equipment (UE) configured to receive a downlink signal from a base station including a two-dimensional antenna array consists of a plurality of antenna elements in a wireless communication system including a radio frequency (RF) unit and a processor configured to control the RF unit, wherein the processor is configured to receive a reference signal allocated to at least one column-direction antenna array of the 2D antenna array, to receive information about a semi-static beam candidate set consists of at least one semi-static beam applicable to the antenna array of the at least one column direction, and to measure an average channel state for semi-static beamforming using the received reference signal and the information about the semi-static candidate set, and wherein the 2D antenna array is virtualized to a one-dimensional (1D) antenna array supporting dynamic beamforming by applying at least one semi-static beam of the semi-static beam candidate set to the column-direction antenna array.

The above-described technical solutions are merely some of the embodiments of the present invention and those skilled in the art may understand that various embodiments having the technical features of the present invention may be derived from the following description.

Advantageous Effects

According to one embodiment of the present invention, a user equipment (UE) or a terminal can receive a downlink radio signal efficiently.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
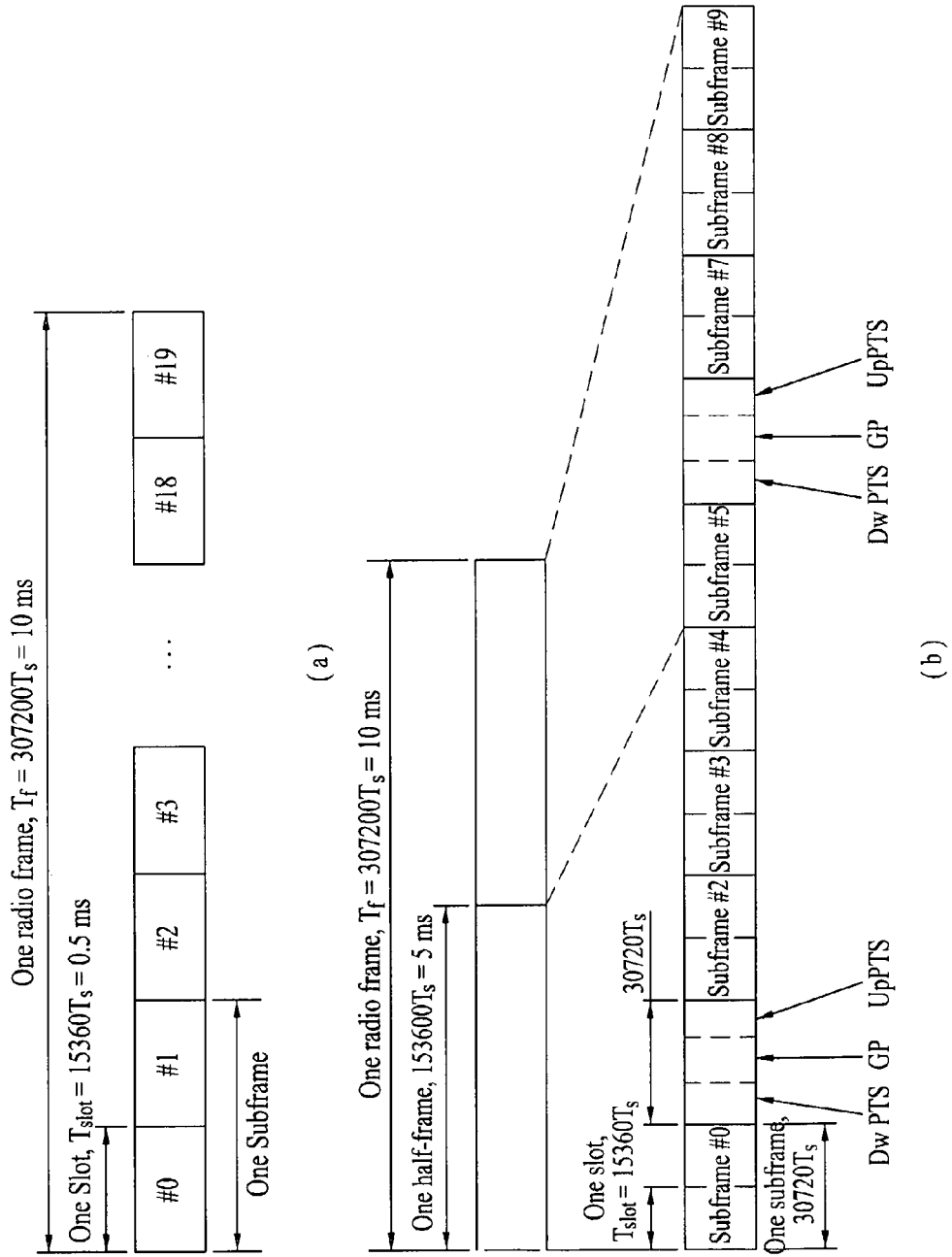
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(*a*) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
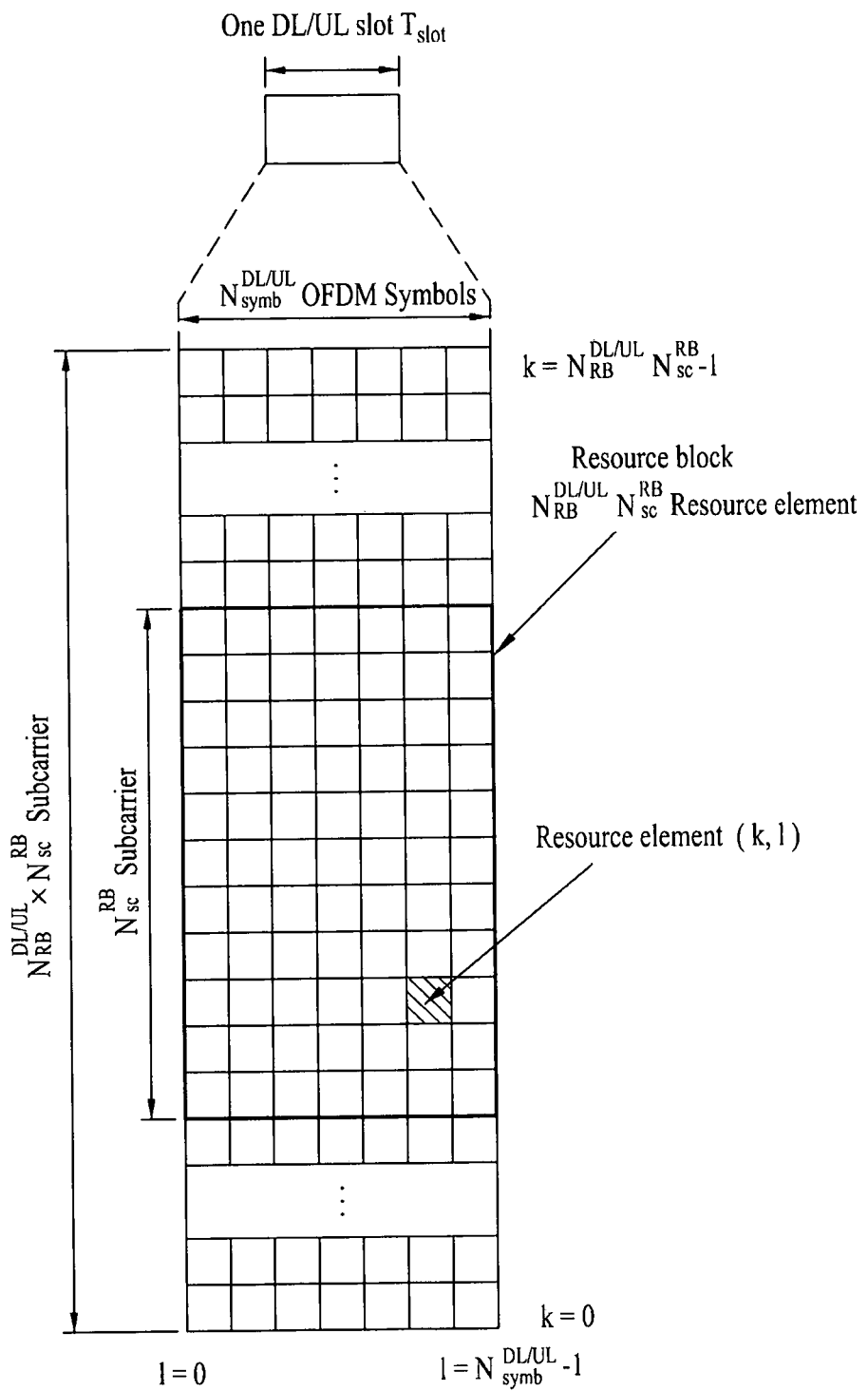
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | 6592 · $T_s$ | | 2192 · $T_s$ | 2560 · $T_s$ | 7680 · $T_s$ | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$ | 4384 · $T_s$ | 5120 · $T_s$ |
| 5 | 6592 · $T_s$ | | 4384 · $T_s$ | 5120 · $T_s$ | 20480 · $T_s$ | | |
| 6 | 19760 · $T_s$ | | | | 23040 · $T_s$ | | |
| 7 | 21952 · $T_s$ | | | | — | — | — |
| 8 | 24144 · $T_s$ | | | | — | — | — |

$N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
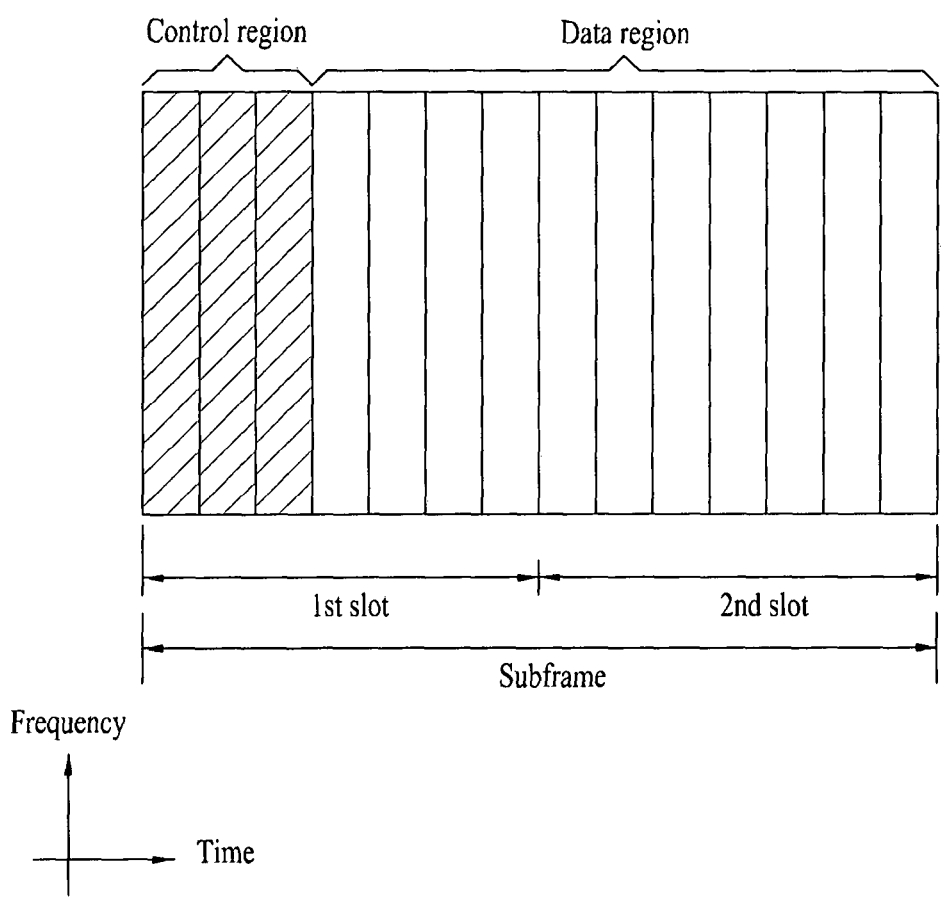
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
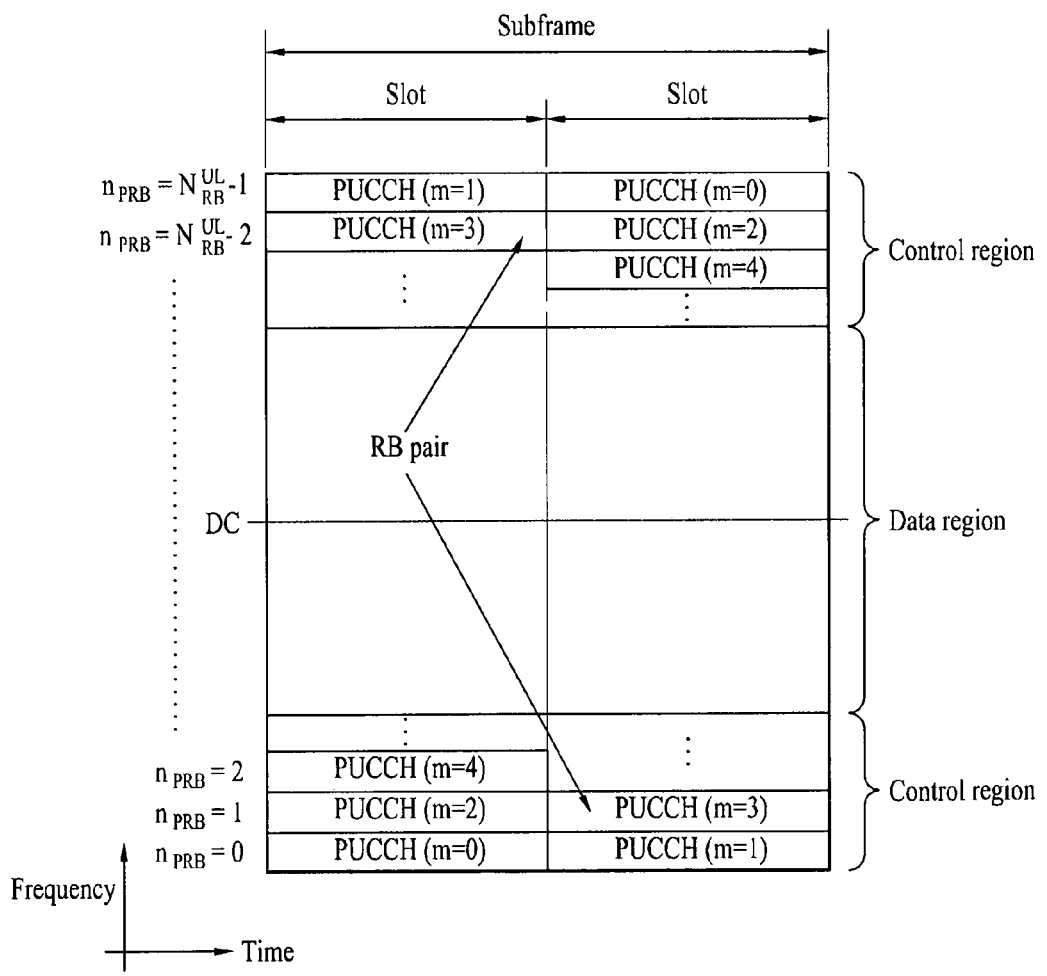
FIG. 4 is a diagram showing an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
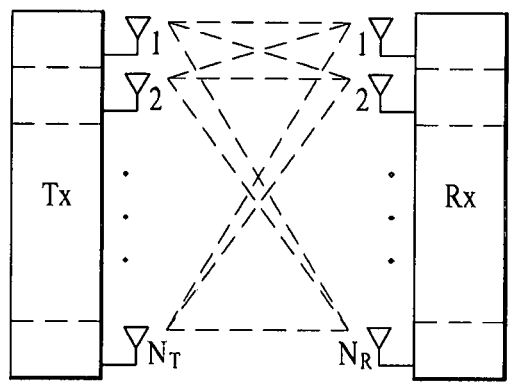
FIG. 5 is a block diagram showing a multi-input multi-output (MIMO) used in a 3GPP LTE/LTE-A system.
Figure 5:
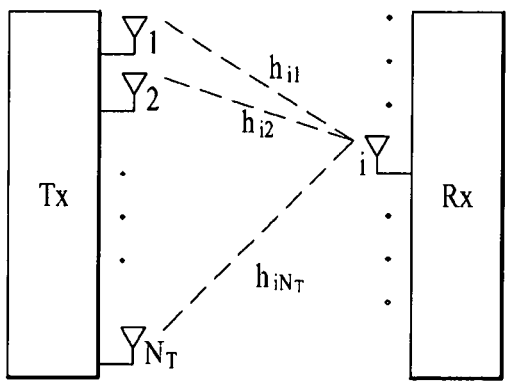

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ denotes a weight between an i-th Tx antenna and j-th information. W is also called a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with Additive white Gaussian noise (AWGN). The AWGN $n_1, n_2, \ldots, n_{N_R}$ added to the NR Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R)$$ [Equation 11]

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Codebook Based Precoding Scheme

A precoding scheme for appropriately distributing transmission information according to the channel states of antennas is applicable in order to support MIMO transmission. A codebook based precoding scheme refers to a scheme for predetermining a set of precoding matrices between a transmitter and a receiver, measuring channel information from the transmitter at the receiver, feeding a suitable precoding matrix (that is, a precoding matrix index (PMI)) back to the transmitter and applying the suitable precoding matrix to signal transmission at the transmitter. Since a suitable precoding matrix is selected from the predetermined set of precoding matrices, an optimal precoding matrix may not always be applied but feedback overhead can be reduced as compared to explicit feedback of optimal precoding information in actual channel information.

Figure 6:
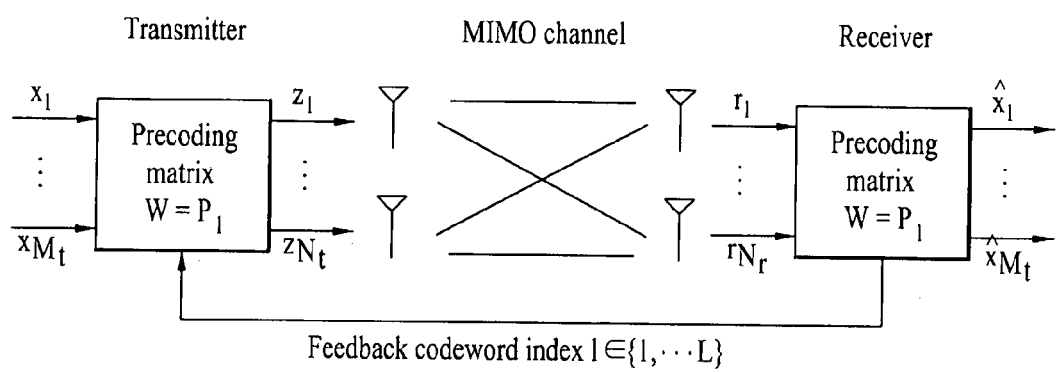
FIG. 6 is a diagram illustrating codebook based beamforming.

FIG. 6 is a diagram illustrating the basic concept of codebook based precoding.

In a codebook based precoding scheme, a transmitter and a receiver share codebook information including a predetermined number of precoding matrices predetermined according to transmission rank, number of antennas, etc. That is, if feedback information is finite, a precoding based codebook scheme may be used. The receiver may measure a channel state via a received signal and feed a finite number of pieces of preferred precoding matrix information (that is, the indices of the precoding matrices) back to the transmitter based on the above-described codebook information. For example, the receiver may measure the received signal using a maximum likelihood (ML) or minimum mean square error (MMSE) method and select an optimal precoding matrix. Although FIG. 6 shows the case in which the receiver transmits precoding matrix information on a per codeword basis, the present invention is not limited thereto.

The transmitter, which has received feedback information from the receiver, may select a specific precoding matrix from the codebook based on the received information. The transmitter, which has selected the precoding matrix, may perform precoding by multiplying layer signals corresponding in number to transmission rank by the selected precoding matrix and transmit the precoded signal via a plurality of antennas. In the precoding matrix, the number of rows is equal to the number of antennas and the number of columns is equal to the rank value. Since the rank value is equal to the number of layers, the number of columns is equal to the number of layers. For example, if the number of transmit antennas is 4 and the number of transmit layers is 2, a 4×2 precoding matrix may be configured. Information transmitted via the layers may be mapped to the antennas via the precoding matrix.

The receiver, which has received the signal precoded and transmitted by the transmitter, may perform an inverse process of precoding performed by the transmitter to restore a received signal. In general, the precoding matrix satisfies a unitary matrix (U) condition such as $U*U^H = I$ and the inverse process of precoding may be performed by multiplying a Hermitian matrix ($P^H$) of the precoding matrix P used for precoding of the transmitter by the received signal.

For example, Table 4 below shows a codebook used for downlink transmission using 2 transmit antennas in 3GPP LTE release-8/9 and Table 5 below shows a codebook used for downlink transmission using 4 transmit antennas in 3GPP LTE release-8/9.

TABLE 4

| Codebook | Number of rank | |
|---|---|---|
| Index | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

TABLE 5

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |

TABLE 5-continued

| Codebook index | $u_n$ | Number of layers v | | | |
|---|---|---|---|---|---|
| | | 1 | 2 | 3 | 4 |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)j/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5 above, $W_n^{\{s\}}$ is obtained by a set $\{s\}$ composed of an equation $W_n = I - 2u_n u_n^H / u_n^H u_n$. At this time, I denotes a 4×4 unitary matrix and $u_n$ denotes a value given in Table 5.

As shown in Table 4 above, a codebook for 2 transmit antennas has a total of 7 precoding vectors/matrices. Since a unitary matrix is for an open-loop system, the total number of precoding vectors/matrices for precoding of a closed-loop system is 6. In addition, a codebook for 4 transmit antennas shown in Table 5 above has a total of 64 precoding vectors/matrices.

Such a codebook has common properties such as a constant modulus (CM) property, a nested property and a constrained alphabet property. The CM property means that elements of all precoding matrices in the codebook do not include "0" and have the same size. The nested property means that a precoding matrix having a low rank is designed to be composed of a subset of specific columns of a precoding matrix having a high rank. The constrained alphabet property means that the elements of all the precoding matrices in the codebook are constrained. For example, the elements of the precoding matrix may be constrained to only an element ±1 used for binary phase shift keying (BPSK), an element ±1,±j used for quadrature phase shift keying (QPSK) or an element $$\pm 1, \pm j, \pm \frac{(1+j)}{\sqrt{2}}, \pm \frac{(-1+j)}{\sqrt{2}}$$

used for 8-PSK. The example of the codebook of Table 5 above may have the constrained alphabet property since the letters of the elements of all the precoding matrices in the codebook are composed of $$\left\{ \pm 1, \pm j, \pm \frac{(1+j)}{\sqrt{2}}, \pm \frac{(-1+j)}{\sqrt{2}} \right\}.$$

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 6 below.

TABLE 6

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 6, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant)

transmitted via a PDCCH signal. Table below shows the mode of the UE when the CQI, the PMI and the RI are transmitted via the PUSCH.

TABLE 7

|  |  | PMI feedback type | | |
|---|---|---|---|---|
|  |  | No PMI | Single PMI | Multiple PMIs |
| PUSCH CQI feedback type | Wideband (wideband CQI) |  |  | Mode 1-2 |
|  | UE selection (subband CQI) | Mode 2-0 |  | Mode 2-2 |
|  | Higher layer configuration (subband CQI) | Mode 3-0 | Mode 3-1 |  |

The transmission mode of Table 7 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 8 below.

TABLE 8

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selection (subband CQI) | Mode 2-0 | Mode 2-1 |

The UE may have the transmission modes shown in Table 8. Referring to Table 8, in Mode 2-0 and Mode 2-1, a bandwidth (BP) part is a set of subbands continuously located in a frequency domain and may cover a system bandwidth or a specified set S. In Table 8, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 8, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, ...}.

The CQI is transmitted at a time of J*K rather than when the wideband CQI/PMI is transmitted.

In Table 8, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters P, H, K and O described in Table 8 are all determined at the higher layer of the UE and signaled to a physical layer of the UE.

Hereinafter, a feedback operation according to the mode of the UE will be described with reference to Table 8. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rel-10.

Each BS may transmit a CSI-RS for channel measurement to the UE via a plurality of antenna ports and each UE may calculate channel state information based on the CSI-RS and transmit the channel state information to each BS in response thereto.

In a wireless communication system after LTE Rel-12, introduction of an active antenna system (AAS) has been considered. Unlike a conventional passive antenna system in which an amplifier for controlling the phase and level of a signal and an antenna are separated, the AAS means a system in which each antenna includes an active element such as an amplifier. The AAS does not require a separate cable or connector for connecting an amplifier and an antenna or hardware according to use of an active antenna and thus has high efficiency in terms of energy and management costs. In particular, since the AAS supports an electronic beam control method on a per antenna basis, advanced MIMO technology such as delicate beam pattern forming considering a beam direction and a beam width or 3D beam pattern forming is possible.

Due to introduction of the advanced antenna system such as the AAS, a large-scale MIMO structure having a plurality of input/output antennas and a multi-dimensional antenna structure is also considered. For example, unlike an existing straight antenna array, if a 2D antenna array is formed, a 3D beam pattern may be formed by the active antenna of the AAS. If the 3D beam pattern is used from the viewpoint of a transmit antenna, semi-static or dynamic beamforming not only in a horizontal direction of a beam but also in a vertical direction may be performed and, for example, applications such as sectorization of a vertical direction may be considered. In addition, from the viewpoint of a receive antenna, when a received beam is formed using a large-scale receive antenna, signal power may be increased according to antenna array gain. Accordingly, in uplink, the BS may receive a signal from the UE via a plurality of antennas. At this time, the UE may set very low transmit power thereof in consideration of gain of a large-scale receive antenna in order to reduce interference influence.

In the present invention, a method of dividing channel information for dynamic beamforming and semi-static beamforming and measuring and feeding back channel information for semi-static beamforming in a 3D beamforming process in an AAS based wireless communication system is proposed.

Figure 7:
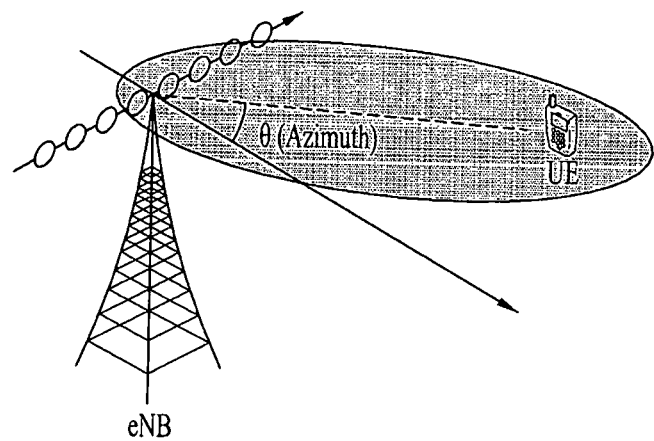
FIG. 7 is a diagram showing an antenna array structure related to embodiment(s) of the present invention.
Figure 7:
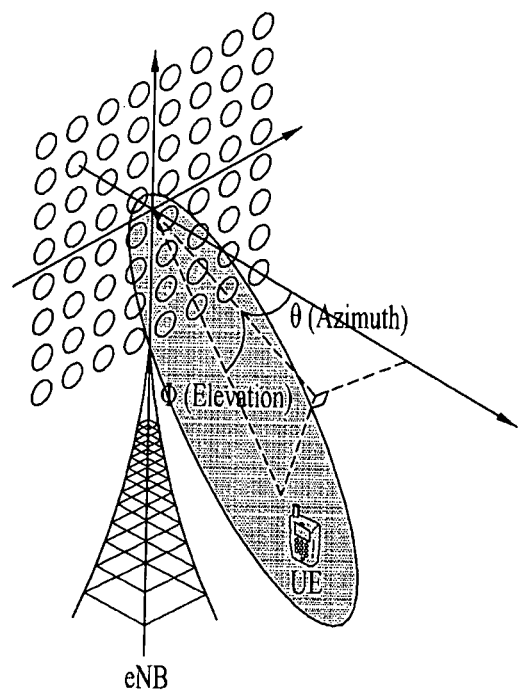

In general, a beam control method for an antenna array may control transmit power and phase value for each antenna to form a beam pattern in which channel gain is concentrated at a specific azimuth on the center of the antenna array on a plane including the antenna array. The antenna array having a uniform interval is referred to as a uniform linear array (ULA). In an LTE system before LTE Rel-12, assume that the BS or the UE has an antenna having a ULA structure. Thus, only a beam direction for a 2D plane in a 3D space can be changed. At this time, the beam direction for the 2D plane may be understood as a beam direction according to an azimuth of the UE relative to the BS. FIG. 7(b) shows the ULA.

If a 2D antenna array of an orthogonal direction is configured, a beam may be formed according to elevation in addition to azimuth so as to form a 3D beam pattern. Meanwhile, in an LTE system after LTE Rel-12, introduction of an active antenna system (AAS) in which an active circuit for controlling the phase and level of a signal is included in each antenna has been considered. As the AAS has been introduced, unlike a mechanical beam control method of an existing system, an electrical beam control method using an active circuit on a per antenna basis may be performed and thus the width and direction of the 3D beam may be more accurately designed. FIG. 7(b) shows an example in which a 3D beam pattern is formed via electrical beam control in a 2D antenna array.

However, as in an existing ULA based system, when a beam is formed on a 2D plane in a horizontal direction of the ground, a signal transmitted between the BS and the UE may be scattered due to obstacles such as buildings or vehicles. Accordingly, in an environment in which obstacles are not considered, when an antenna beam pattern may be set to have maximum gain at an azimuth corresponding to a straight path between the BS and the UE, maximum beam gain may be provided to the UE. However, in an environment in which obstacles are considered, a transmitted beam pattern concentrated at an azimuth which is irrelevant to the straight path may provide maximum beam gain to the UE.

Figure 8:
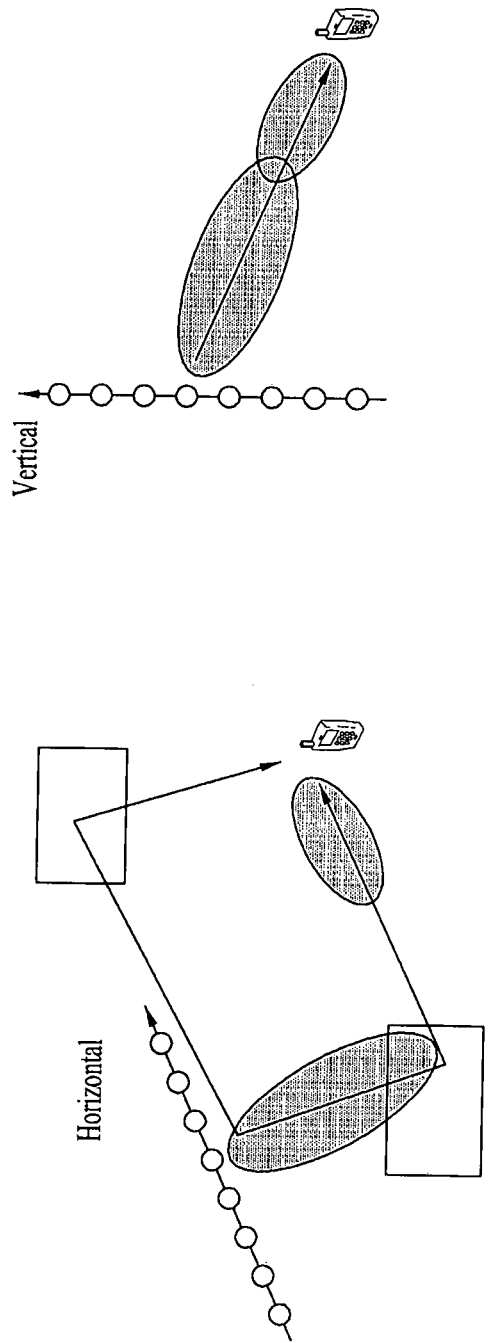
FIG. 8 is a diagram showing an example illustrating an antenna array structure related to embodiment(s) of the present invention.

FIG. 8 shows a transmission environment considering obstacles.

The left of FIG. 8 shows effects due to scattering when an obstacle is present between a BS and a UE in a horizontal beamforming process. In contrast, if a beam is formed on a 2D plane in a vertical direction of ground, a beam pattern is formed in a ground space and an obstacle to be considered is insignificant. That is, an antenna beam pattern in which beam gain is concentrated at an elevation corresponding to a straight line between the BS and the UE may provide maximum beam gain to the UE. The right of FIG. 8 shows beam characteristics of the vertical direction.

In a system before LTE Rel-12, a feedback structure for horizontal beamforming has been actively discussed but a feedback structure for semi-static beamforming has not been provided. Accordingly, in the present invention, a precoding scheme considering dynamic beamforming and semi-static beamforming in the 3D beamforming process and a feedback structure for precoding are proposed.

In the proposed scheme, a horizontal virtual 1D antenna array in which each antenna element has a specific beam property according to a vertical direction by applying a semi-static beam pattern to a vertical column of a 2D antenna array in a vertical and horizontal direction is assumed and a precoding scheme for applying a dynamic beam pattern to the virtual 1D antenna array is assumed. The BS informs the UE that a specific reference signal is used to measure average channel information for semi-static beamforming and the UE uses the reference signal to acquire average channel information for semi-static beamforming.

The average channel information may be composed of a quantization channel value for a relative phase difference for each antenna port based on a specific reference antenna port and transmit power of each antenna port corresponding to a semi-static beam, the beam gain of which is optimal with respect to the measurement reference signal, or may be composed of indices of candidates corresponding to higher values or an index of a candidate corresponding to a highest value (that is, highest receive power value) with respect to candidate groups of semi-static beam patterns predefined between the BS and the UE by applying the candidate groups of the beam patterns to the reference signal and calculating receive power.

In addition, the average channel information includes tag information indicating from which reference signal a value is measured and may be transmitted via a higher layer or may be aperiodically transmitted via a relatively large container such as a PUSCH.

In the present invention, a system environment in which a semi-static beam pattern is applied to an antenna array supporting 3D beamforming and the antenna array is converted into an antenna array supporting 2D dynamic beamforming is assumed. In a detailed embodiment, if the semi-static beam pattern is applied to the 2D antenna array supporting 3D beamforming, the antenna array may be converted into a virtual 1D antenna array supporting 2D dynamic beamforming. At this time, a reference signal used for 2D dynamic beamforming is transmitted by a virtual antenna array to which the semi-static beam pattern is applied and a feedback structure of systems before LTE Rel-12 may be reused using the reference signal. Accordingly, in the present invention, operation principle of the semi-static beam pattern will be described. Hereinafter, for convenience of description, although the operation principle of the present invention is described in an LTE system, the operation according to the present invention is applicable to an arbitrary wireless communication system supporting a 3D beam pattern composed of a dynamic beam and a semi-static beam.

According to one embodiment of the present invention, when a semi-static beam pattern is applied to a 2D antenna array to form a virtual 1D antenna array, a method of allocating a specific reference signal to a UE for the purpose of measuring average channel information for semi-static beamforming at an eNB or a transmit point will be described.

Figure 9:
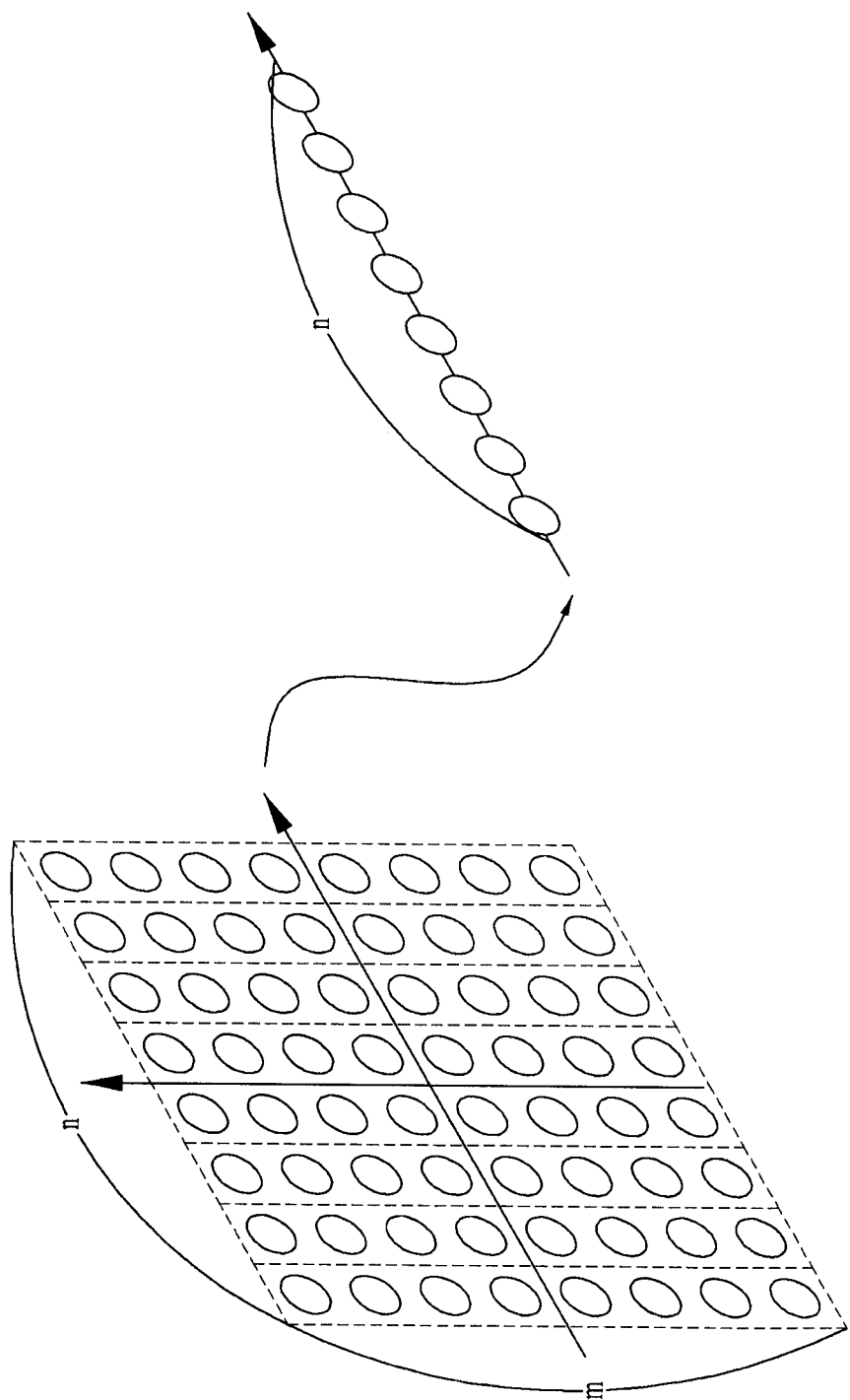
FIG. 9 is a diagram virtualization of an antenna array according to embodiment(s) of the present invention.

According to one embodiment of the present invention, as shown in FIG. 7(b), a system in which an antenna array is present in vertical and horizontal directions is assumed. At this time, a 2D antenna array is configured in a rectangular shape by m×n antenna elements. A 1D antenna array of a vertical direction corresponding to an arbitrary k-th column corresponds to one antenna element if a semi-static beam pattern is applied and thus the m×n antenna array may be virtualized to a 1×n horizontal 1D antenna array as shown in FIG. 9. When the semi-static beam pattern is applied, different semi-static beams may be applied to respective vertical columns. For example, an m×1 semi-static beam $w_i = [r_{i1}e^{j\theta i1} \ r_{i2}e^{j\theta i2} \ldots r_{im}e^{j\theta im}]$ is applied to data transmitted via an i-th vertical 1D m×1 antenna array to correspond to one antenna element.

Here, the BS may transmit a reference signal such as a CSI-RS via an arbitrary vertical 1D antenna array and measure average channel information for semi-static beamforming as shown in FIG. 9.

If the same semi-static beam is applied to each column of the 2D antenna array shown in FIG. 9, CSI-RS resources may be allocated to the vertical 1D antenna array corresponding to one column to measure the average channel information. For example, in FIG. 9, in case of m=8 and n=8, if an 8-port CSI-RS is transmitted via eight vertical antenna ports corresponding to a first column, the UE may calculate an average direction of a channel via the reference signal and arbitrarily select a semi-static beam pattern or directly apply candidates of the semi-static beam pattern predefined with the BS to confirm performance of a specific beam.

Alternatively, if a different semi-static beam is applied to each column of the 2D antenna array, a plurality of CSI-RS resources may be allocated to the vertical 1D antenna array corresponding to a plurality of columns according to the demand of the BS to measure the average channel information. For example, in FIG. 9, in case of m=8 and n=8, an 8-port CSI-RS, that is, $CSI-RS_1$, is transmitted via eight vertical antenna ports corresponding to a first column, an 8-port CSI-RS, that is, $CSI-RS_2$, is transmitted via eight vertical antenna ports corresponding to a fifth column, a semi-static beam pattern is determined using the average channel information measured by $CSI-RS_1$ from the first to fourth columns, and a semi-static beam pattern is determined using the average channel information measured by $CSI-RS_2$ from the fifth to eighth columns.

Meanwhile, a reference signal for dynamic beamforming is transmitted via a virtual 1D antenna array to which the semi-static beam is applied. That is, the reference signal for dynamic beamforming is transmitted in the form in which the semi-static beam is precoded. Accordingly, the UE may report CSI information such as RI (rank indicator), PMI (precoding matrix indicator) or CQI (channel quality indicator) used for actual data transmission to the BS according to the feedback structure of the Rel-11 LTE system. In contrast, the reference signal for semi-static beamforming is used to report, to the BS, a beam direction of a specific semi-static beam or a measurement value such as a receive power strength when the beam direction is applied and is different from the reference signal for dynamic beamforming in terms of usage thereof. Accordingly, the BS should inform the UE that the specific reference signal is used for semi-static beamforming.

Figure 10:
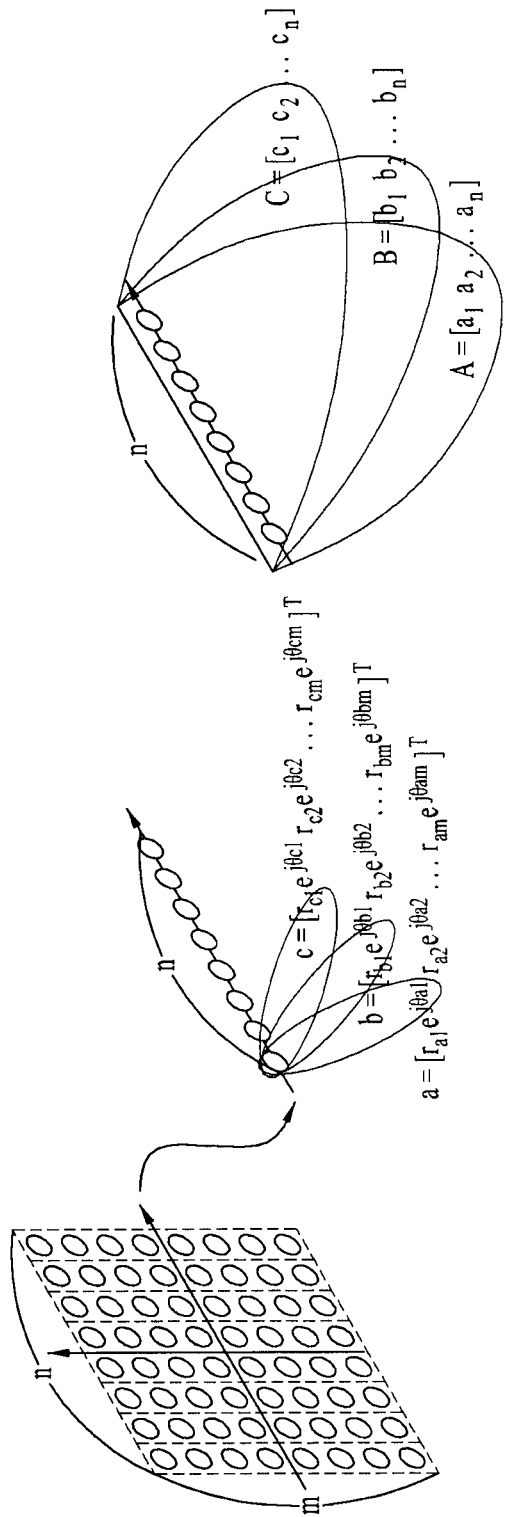
FIG. 10 is a diagram virtualization of an antenna array according to embodiment(s) of the present invention.

According to one embodiment of the present invention, when the semi-static beam pattern is applied to the 2D antenna array to form a virtual 1D antenna array, a method of, at the BS, configuring a set of semi-static beam patterns composed of a finite number of elements identified by indices with respect to the semi-static beam pattern and, at the UE, utilizing a reference signal for average channel information measurement for semi-static beamforming to feed back an index of a single or plurality of semi-static beam patterns having high receive power in a set of semi-static beam patterns or a receive power value will be described. As described above, the semi-static beam may be used for vertical sectorization from the viewpoint of the BS and the BS may define a semi-static beam pattern set composed of a finite number of elements corresponding to the number of vertical sectors. At this time, a specific semi-static beam pattern in the semi-static beam pattern set does not necessarily have a fixed value. As described above, if the vertical sector corresponds to the semi-static beam pattern, the UEs included in the vertical sector may share a reference signal for dynamic beamforming precoded with the semi-static beam pattern corresponding to the sector. The detailed values of the semi-static beam corresponding to the specific element in the set of semi-static beam patterns composed of a finite number of elements configured by the BS may be signaled to the UE via a higher layer signal. The set of semi-static beam patterns may be expressed by a set of precoding vectors applicable when the same semi-static beam is applied to each column with respect to the vertical 1D antenna array corresponding to an arbitrary column in the 2D antenna array as shown in FIG. 10 or may be expressed by a set of precoding vectors applicable to all n vertical columns when different semi-static beams are applied to columns.

Accordingly, in one embodiment of the present invention, a method of sharing information about a set of semi-static beam patterns composed of a finite number of elements identified by indices predefined between a BS and a UE with respect to the semi-static beam (e.g., a vertical sector is formed with a fixed number of semi-static beam patterns) or, at the BS, providing information about the set of the semi-static beam patterns to the UE via a higher layer signal (e.g., a vertical sector is formed with a number of semi-static beam patterns, which may be changed according to BS operation), at the UE, selecting a single or plurality of semi-static beam patterns with high receive power when a specific beam pattern among semi-static beam patterns included in the set of semi-static beam patterns is applied to the measurement reference signal as feedback of the average channel information, and, at the UE, informing the BS of the index of the semi-static beam pattern or the receive power values as feedback information is proposed. At this time, the set of semi-static beam patterns may be expressed in the form of a codebook composed of a set of 1D precoding vectors if the same semi-static beam is configured in each antenna element of a virtual 1D antenna array or may be expressed in the form of a codebook composed of a set of precoding vectors applicable to n vertical columns, that is, a set of m×n matrices if different semi-static beams are configured per antenna element. The codebook is for an AAS based semi-static beam pattern and may have a structure different from that of a codebook supported by a legacy Rel-11 LTE system in that a degree of freedom for setting phase and transmit power per antenna port is high. At this time, the UE may measure receive power of one antenna element at one or a plurality of receive antennas if the semi-static beams of the antenna ports are the same and may measure receive power of a plurality of antenna elements at one or a plurality of receive antennas if the semi-static beams of the antenna elements are different, with respect to the virtual 1D antenna array to which the semi-static beam pattern is applied.

According to one embodiment of the present invention, when a semi-static beam pattern is applied to a 2D antenna array to form a virtual 1D antenna array and the BS configures a set of semi-static beam patterns composed of a finite number of elements identified by indices, a method of associating a semi-static beam pattern having a specific index with a specific reference signal resource for dynamic beamforming will be described. The dynamic beamforming process is performed with respect to a virtual 1D antenna array to which a specific semi-static beam pattern is applied and thus a reference signal for dynamic beamforming is precoded with the specific semi-static pattern. At this time, the UE should be informed of the index of the semi-static beam pattern with which the reference signal resource is associated, in order to determine that the reference signal for dynamic beamforming is no longer valid when the BS changes the semi-static beam pattern of the UE to a semi-static beam pattern having another index. Accordingly, in the present invention, a method of associating a semi-static beam pattern having a specific index with a specific reference signal resource for dynamic beamforming is considered and, for example, index information of the semi-static beam pattern may be included in higher layer information for configuring a CSI-RS.

According to another embodiment of the present invention, when the BS changes a semi-static beam pattern, a method of, at the UE, recognizing the changed semi-static beam pattern and performing feedback using the reference signal for dynamic beamforming to which the semi-static beam pattern is applied will be described. When the BS changes the semi-static beam pattern to a semi-static beam pattern having an index different from that of a semi-static beam pattern applied to the UE and provides a service to the UE, the reference signal for dynamic beamforming is changed to a reference signal precoded with the changed semi-static beam pattern. At this time, in the above-described embodiment of the present invention, as described above, since a specific index of a semi-static beam pattern corresponds to a specific reference signal for dynamic beamforming, the UE may confirm which reference signal is currently precoded with the semi-static beam. Accordingly, in the present invention, a method of, at a UE, performing feedback using a reference signal for dynamic beamforming corresponding to an index of a changed semi-static beam pattern without a separate instruction of a BS in a feedback process is proposed. At this time, the UE should know a set of reference signals for dynamic beamforming corresponding to indices of a set of semi-static beam patterns.

That is, the BS may configure a specific reference signal A (e.g., a CSI-RS resource) for semi-static beamforming with respect to the UE, for long-term feedback of the UE, and the UE may select a best semi-static beam pattern from among a finite number of predefined specific codebook indices via the reference signal A and report the best semi-static beam pattern to the BS for a long term. At this time, the BS may set information indicating that each codebook index is linked to one (or some) of a plurality (finite number) of specific reference signals (B, C, D, . . . ) (e.g., multiple CSI-RS resources) configured for dynamic feedback of the UE and linkage information via a higher layer signal (e.g., via RRC signaling) with respect to the UE and the UE performs dynamic feedback reporting of RI/PMI/CQI based on the specific reference signal (one or some of B, C, D, . . . ) linked to the codebook index from a "predetermined specific time" if the best codebook index is selected (and/or reported) based on the configuration information. At this time, the "predetermined specific time" may be variously predefined. For example, after the UE initially selects (or updates) a specific best codebook index, the following may be defined:

- a time when RI is initially reported,
- a time when PMI is initially reported,
- a time when first PMI (e.g., W1) is initially reported,
- an explicitly specified time (e.g., configured via RRC signaling),
- immediately after the specific best codebook index is initially selected (or updated) (in particular, in case of aperiodic feedback (e.g., via PUSCH)).

As a method of, at the UE, performing long-term feedback with respect to a best codebook index via the reference signal A, the following methods are possible:

- feedback via a separate periodic feedback configuration (separately configured by the BS)
- feedback only when separate aperiodic triggering from the BS occurs
- feedback linked to aperiodic CSI feedback triggered by DCI
- feedback in a state of being joint encoded with RI (or first PMI (e.g., W1))

When the BS transmits (e.g., broadcasts) the reference signals (B, C, D, . . . ), the "precoded reference signals (B, C, D, . . . )" to which the best semi-static beam corresponding to the codebook index of the reference signals A is applied may be transmitted and dynamic feedback of RI/PMI/CQI may be performed based on one or some of the linked precoded reference signals (B, C, D, . . . ) depending upon which best codebook index is selected/reported by the UE via the reference signal A according to the above-described method.

According to another embodiment of the present invention, when a semi-static beam pattern is applied to a 2D antenna array to form a virtual 1D antenna array and feedback to the BS is performed using the average channel information, a method of configuring feedback information using a quantization value for a relative phase difference for each antenna port based on a specific reference antenna port and transmit power of each antenna port corresponding to a semi-static beam pattern, the beam gain of which is optimal with respect to the measurement reference signal, will be described. In the semi-static beam pattern, the power and phase of the antenna may be freely changed as compared to the conventional method. Accordingly, in one embodiment of the present invention, when the channel information of the semi-static beam pattern is fed back, a method of transmitting information about a phase difference per antenna port based on power of each antenna port and a specific reference antenna port is proposed.

Feedback of the semi-static beam pattern is slowly changed with time. Accordingly, sophisticated information, which may completely use the property of the AAS with respect to the average channel information measured by the UE, is advantageously fed back. Each UE performs sophisticated feedback of an optimal single or plurality of semi-static beam patterns. At this time, the BS may collect information about the semi-static beams fed back by a plurality of UEs and flexibly configure a vertical sector based on the information. If semi-static beam patterns fed back by the UEs are gathered in two specific semi-static beam patterns with low interference, two vertical sectors may be configured with the semi-static beam pattern. Alternatively, if semi-static beam patterns are not gathered, one vertical sector may be configured as in the legacy Rel-11 system.

As an example of the power and phase difference of the semi-static beam pattern, when a CSI-RS for average channel information measurement for a semi-static beam at a 1D antenna array corresponding to an arbitrary column of a 2D antenna array is transmitted, the UE may feed a first column $v_1$ of a V matrix back as an eigenvector corresponding to a maximum eigenvalue at $H=U\Sigma V^H$ according to singular value decomposition (SVD) of a channel matrix H specified via the CSI-RS. At this time, the UE may configure a relative phase difference between reference elements of a specific reference element (e.g., a first element of v1) and size of each element of $v_1$ as the feedback information. The feedback information may be delivered to the BS via a container such as a PUSCH in an aperiodic method in addition to the higher layer signal. The feedback information may be used when the BS configures a set of semi-static beam patterns composed of a finite number of elements identified by indices. In this case, the set of semi-static beam patterns composed of the finite number of elements is maintained and the BS may flexibly control the values of the semi-static beam patterns corresponding to the elements.

According to another embodiment of the present invention, when the BS configures a set of semi-static beam patterns composed of a finite number of elements identified by indices, if the index of the semi-static beam pattern applied by the BS is not changed but the detailed value of the beam pattern is readjusted, a method of informing whether the semi-static beam direction is changed in order to accurately support feedback for dynamic beamforming will be described. When the BS changes the direction of the semi-static beam for the UE, the reference signal for dynamic beamforming to which the semi-static beam is applied is also precoded with the newly selected semi-static beam. In general, in feedback of the legacy Rel-11 system for dynamic beam, the RI is first determined and the PMI/CQI is determined under the RI. Accordingly, even when precoding applied to the reference signal such as the CSI-RS for dynamic beamforming is changed according to change in semi-static beam direction, precoding is not immediately applied to feedback but is preferably applied when the RI is updated. However, the UE may not confirm whether the BS has changed the semi-static beam direction without a separate signal. Accordingly, the BS should send, to the UE, information indicating that the semi-static beam direction has been changed via a higher layer signal. At this time, the UE may use the reference signal for dynamic beamforming received before the semi-static beam direction is changed for feedback information before the RI is first updated after the semi-static beam direction has been changed and use the reference signal for dynamic beamforming received after the semi-static beam direction is changed for feedback information after the RI is first updated after the semi-static beam direction has been changed, in the feedback process for dynamic beamforming.

According to another embodiment of the present invention, when an average channel for semi-static beamforming is measured using a specific reference signal, a method of utilizing a filtering scheme and the number of filter taps predetermined between the BS and the UE will be described. The semi-static beam may be used for the purpose of subdividing coverage via vertical sectorization from the viewpoint of the BS in addition to the purpose of maximizing beam gain from the viewpoint of the UE. Accordingly, the average channel information measured by the UE using the specific reference signal for semi-static beamforming may be reported to the BS and used for vertical sectorization in the BS. At this time, the method of acquiring the average value is changed according to UE and thus the semi-static beam direction may be distorted. Accordingly, in one embodiment of the present invention, a method of, at the BS, predetermining a constraint for the method of acquiring the average channel information with respect to the UE or signaling the constraint via a higher layer signal is proposed. For example, the BS may determine information about the number of filter taps or the filtering scheme used to acquire the average channel information at the UE and signal the information to the UE. For example, when the average channel is obtained and when the UE uses the CSI-RS for average channel information measurement of the semi-static beam to ensure average channel information on a time axis, a weighted moving average is applicable to the time axis. At this time, the UEs which report the average channel information should apply the taps of the weighted moving filter to have the same weight. In addition, even when an average of a plurality of CSI-RS resources on the time axis is obtained, the same CSI-RS resources should be used. Information about the filtering tap coefficient and the number of time-axis taps may be signaled from the BS to the UE via a higher layer or may be predefined between the BS and the UE.

According to one embodiment of the present invention, a method of including tag information of the reference signal used upon measurement in the information fed back by the UE for semi-static beamforming will be described. Assume that, in a network environment in which heterogeneous BSs are present, the BS and the remote radio head (RRH) support 3D beamforming. At this time, since the UE which supports a coordinated multi-point transmission (CoMP) scheme receive a signal from both transmission points, a semi-static beamforming process for each transmission point should be performed. At this time, the BS may configure reference signals for average channel measurement for semi-static beamforming transmitted from the BS and the RRH and the UE should send a feedback result corresponding to each reference signal. Accordingly, information indicating which measurement reference signal is used should be added to feedback for semi-static beamforming.

According to one embodiment of the present invention, a fallback procedure for avoiding ambiguity occurring in a process of reconfiguring a reference signal for dynamic beamforming or reconfiguring a reference signal for semi-static beam pattern forming or reconfiguring a semi-static beam pattern in a 3D beamforming process will be described. In a period from when the semi-static beam pattern configured by the BS with respect to the UE is changed and to when the changed semi-static beam pattern is applied to the UE or a period from when a reference signal for dynamic beamforming and semi-static beam pattern forming is reconfigured to when the reconfigured reference signal is applied to the UE, the BS may not trust the feedback information of the UE and thus ambiguity may occur. For example, if the direction or detailed value of the semi-static beam pattern configured with respect to the UE is changed, CSI information (e.g., RI, PMI, CQI, etc.) measured with the reference signal for dynamic beamforming before a reconfiguration process is finished is determined based on the reference signal precoded with the semi-static beam which is not reconfigured and thus is not valid. Accordingly, in the present invention, a method of enabling the BS to operate in a fallback mode in the above environment is proposed.

The fallback mode is based on a cell-specific reference signal (CRS) based transmission scheme and may be implemented using a transmission method according to a single antenna port or a transmit diversity scheme. Alternatively, since the UE after Rel-11 may perform feedback for a plurality of CSI-RSs, the BS may allocate, to the UE, the CSI-RS transmitted according to the fixed semi-static beam for the fallback mode, pre-secure the CSI for the CSI-RS, and perform CSI based data transmission in the fallback mode if the semi-static beam is changed. In this case, instead of the CRS based fallback mode, the precoding fallback mode may be performed.

According to another embodiment of the present invention, when operation is performed in a fallback mode, a method of delivering downlink power information for a fallback mode to the UE in addition to downlink power information according to 3D beamforming will be described. According to the present embodiment, a specific semi-static beam pattern corresponds to specific vertical sectorization and a fixed semi-static beam pattern according to a fallback mode corresponds to an overall region of the BS defined in the legacy Rel-11 system. At this time, transmit power when the BS performs transmission according to vertical sector and transmit power when transmission is performed with respect to the overall region of the BS may be different. Accordingly, the BS should inform the UE of power information for fallback operation in addition to the power information for data demodulation when 3D beamforming is applied. As one example of the power information, in the LTE system, energy per resource element (EPRE) for power allocation of downlink resources is defined and a reference value is based on the EPRE for the CRS. The CRS EPRE is determined by a higher layer signal and has a fixed value within a subframe and a downlink system band. At this time, in an LTE system, the EPRE for resources of a physical data shared channel (PDSCH) in which actual data is transmitted may be expressed by a predetermined ratio of the CRS EPRE. For example, a ratio of the CRS EPRE to the PDSCH EPRE in an orthogonal frequency division multiplexing (OFDM) symbol in which a CRS is not present is defined as $\rho_A$ and a ratio of the CRS EPRE to the PDSCH EPRE in an OFDM symbol in which a CRS is present is defined as $\rho_B$. As another example of the power information, $P_c$ indicating a ratio of the CSI-RS EPRE to the PDSCH EPRE may be considered. According to the operation of the present invention, information about $\rho_A$, $\rho_B$, $P_c$ may have different values upon data transmission in the fallback mode and upon data transmission to which 3D beamforming is applied. That is, the BS should inform the UE of $\rho_{A2}$, $\rho_{B2}$, and $P_{c2}$ for the fallback mode and $\rho_{A1}$, $\rho_{B1}$, and $P_{c1}$ for the case of applying 3D beamforming. Here, if the fallback operation is based on the CRS based transmission method indicated by DCI format 1A, the fallback mode may be recognized according to detection of DCI format 1A and data demodulation according to $\rho_{A2}$, $\rho_{B2}$, and $P_{c2}$ may be performed. In contrast, if the fallback operation is based on the CRS-RS for the fixed semi-static beam, the UE may be informed that the current operation is the fallback operation via DCI. At this time, like the MBSFN subframe, when the fallback mode is indicated by DCI format 1A in the subframe in which the CRS is not present, the UE may perform the fallback mode based on the CSI-RS without separate indication.

Figure 11:
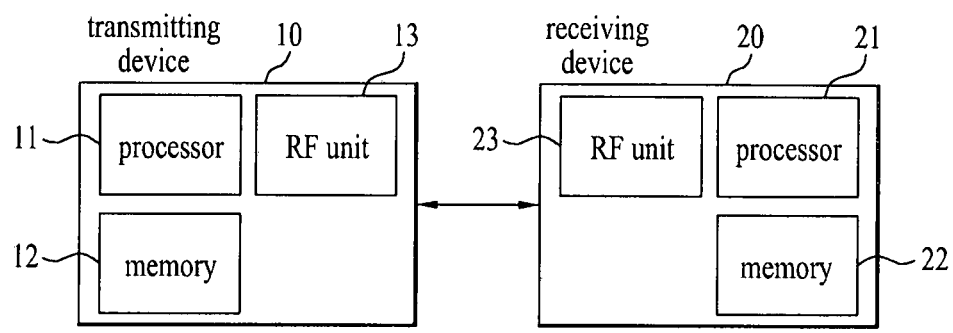
FIG. 11 is a block diagram of an apparatus for implementing embodiment(s) of the present invention.

FIG. 11 is a block diagram showing components of a transmitter 10 and a receiver 20 for performing the embodiments of the present invention. The transmitter 10 and the receiver 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), Digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitter 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiver 20 is the inverse of signal processing of the transmitter 10. Under control the processor 21, the RF unit 23 of the receiver 20 receives a radio signal transmitted by the transmitter 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitter 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiver 20. A reference signal (RS) transmitted in correspondence with the antenna defines the antenna viewed from the viewpoint of the receiver 20 and enables the receiver 20 to perform channel estimation of the antenna regardless of whether the channel is a single radio channel from a single physical antenna or a composite channel from a plurality of physical antennal elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE or a relay operate as the transmitter 10 in uplink and operates as the receiver 20 in downlink. In the embodiments of the present invention, a BS operates as the receiver 20 in uplink and operates as the transmitter 10 in downlink.

The transmitter and/or the receiver may perform a combination of at least one or two embodiments among the above-described embodiments of the present invention.

Although the embodiments of the present invention are described as a receiver operating in uplink, the embodiments of the present invention are applicable to a receiver operating in downlink.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used for a wireless communication apparatus such as a user equipment (UE), a relay and a base station (BS).

The invention claimed is:

1. A method of a receiving a downlink signal from a base station including a two-dimensional (2D) antenna array consists of a plurality of antenna elements in a wireless communication system, the method comprising:

receiving a reference signal allocated to at least one column-direction antenna array of the 2D antenna array;
receiving information about a semi-static beam candidate set consists of at least one semi-static beam applicable to the at least one column-direction antenna array; and
measuring an average channel state for semi-static beamforming using the received reference signal and the information about the semi-static candidate set,
wherein the 2D antenna array is virtualized to a one-dimensional (1D) antenna array supporting dynamic beamforming by applying at least one semi-static beam of the semi-static beam candidate set to the column-direction antenna array.

2. The method according to claim 1, wherein the measuring the channel state includes determining a semi-static beam for enabling the reference signal to be received with maximum received power, from among the semi-static beam candidate set.

3. The method according to claim 2, further comprising:
transmitting information about the determined semi-static beam to the base station.

4. The method according to claim 2, wherein the information about the determined semi-static beam includes a size of each element of a vector corresponding to the determined semi-static beam and/or a relative phase difference between elements.

5. The method according to claim 1, wherein each semi-static beam of the semi-static beam candidate set corresponds to one of vertical sectors served by the base station.

6. The method according to claim 1, further comprising:
receiving information indicating that the reference signal is for semi-static beamforming.

7. The method according to claim 1, wherein the semi-static beam is associated with reference signal resources for dynamic beamforming.

8. The method according to claim 1, further comprising:
if the semi-static beam is changed, receiving information indicating the change.

9. The method according to claim 8, further comprising:
receiving a predetermined reference signal allocated to the at least one column-direction antenna array, to which a fixed semi-static beam is applied, until reconfiguration is completed using the changed semi-static beam.

10. The method according to claim 9, further comprising:
receiving power information for transmitting the downlink signal to be used until reconfiguration is completed using the changed semi-static beam.

11. A user equipment (UE) configured to receive a downlink signal from a base station including a two-dimensional antenna array consists of a plurality of antenna elements in a wireless communication system, the UE comprising:
a radio frequency (RF) unit; and
a processor configured to control the RF unit,
wherein the processor is configured to receive a reference signal allocated to at least one column-direction antenna array of the 2D antenna array, to receive information about a semi-static beam candidate set consists of at least one semi-static beam applicable to the antenna array of the at least one column direction, and to measure an average channel state for semi-static beamforming using the received reference signal and the information about the semi-static candidate set, and
wherein the 2D antenna array is virtualized to a one-dimensional (1D) antenna array supporting dynamic beamforming by applying at least one semi-static beam of the semi-static beam candidate set to the column-direction antenna array.

* * * * *